Patented Feb. 11, 1936

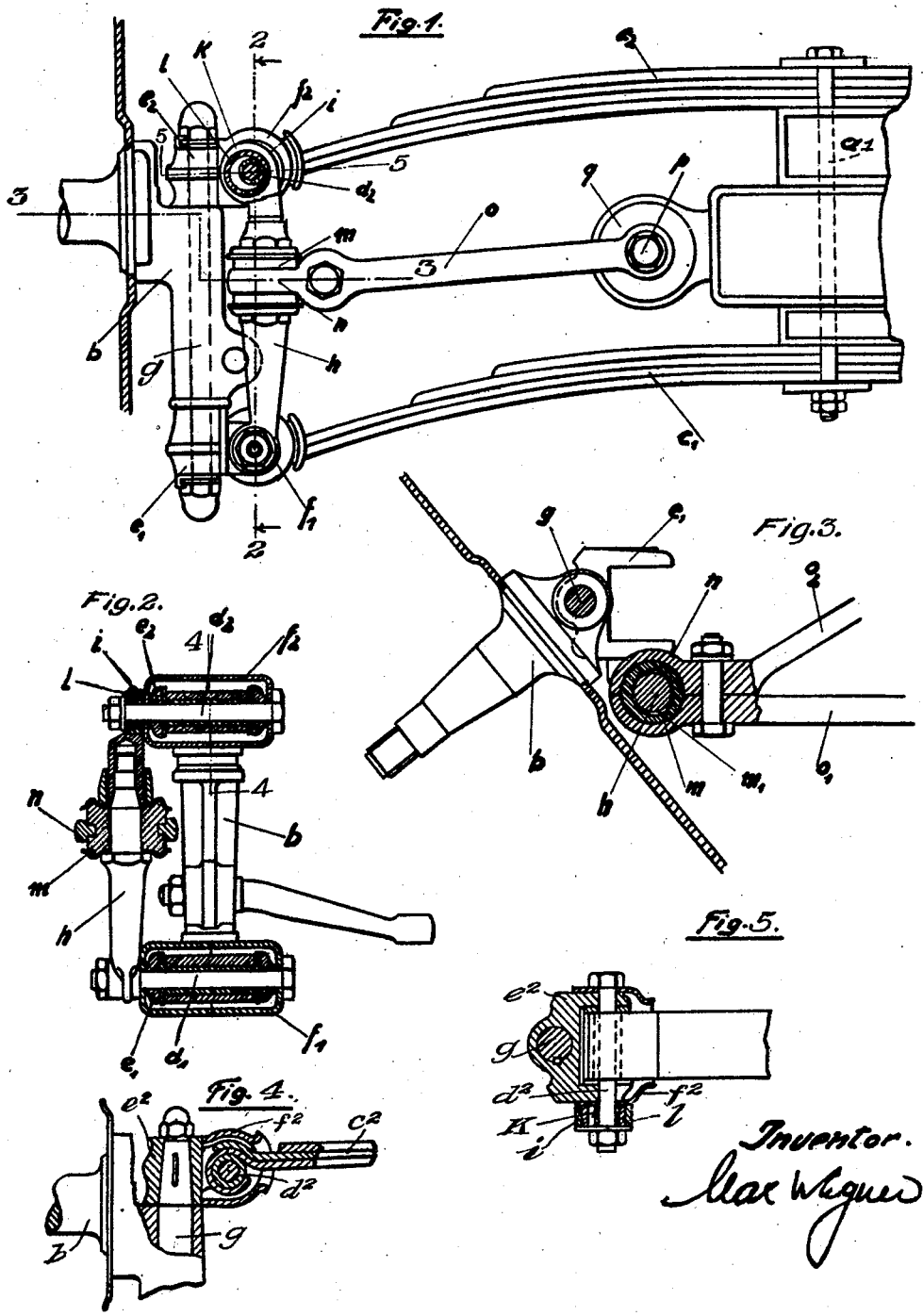

2,030,557

UNITED STATES PATENT OFFICE 2,030,557

VEHICLE SUSPENSION

Max Wagner, Stuttgart, Germany, assignor to Daimler-Benz Aktiengesellschaft, Stuttgart-Unterturkheim, Germany, a company of Germany Application January 28, 1932, Serial No. 589,450
In Germany June 4, 1931

14 Claims. (Cl. 267—19)

This invention relates to a method of connecting vehicle wheels to the underframe of the vehicle, more particularly for automobile vehicles, wherein each wheel is independently sprung, and is connected with the vehicle frame by two substantially parallel swinging elements, at least one of which is a laminated spring.

The object of the invention is to improve connections of this nature, and the invention consists primarily in providing a further connecting element between the axle piece of the vehicle wheel and the underframe, this further connecting element serving to maintain the parallel guidance of the wheel in the event of breakage of the laminated spring, a not infrequent occurrence, thereby obviating the risk of a serious accident.

Now in order that the normal spring suspension, consisting for example of two laminated springs, or of one laminated spring and a guiding link, may not be hampered by the provision of this third element, a guiding link for example, serving for the auxiliary connection, the invention further provides a small amount of clearance between this element and the axle piece, which must be the greater the more the movement of this auxiliary element differs from the movement of the laminated spring or springs, but which may also be advantageous in the case of exact parallelogram guidance.

A further object of the invention is to provide particularly advantageous constructional forms of this connection by arranging an intermediate piece for example, particularly in the case of pivoted wheels swinging round a vertical axis. The auxiliary guiding link may in this case also actuate a shock absorber.

One example of construction of the invention is illustrated in the accompanying drawing, in which Figure 1 shows a front wheel suspension according to the invention in elevation, Figure 2 shows a cross section thereof on the line 2—2 in Figure 1, Figure 3 shows a plan, partly in section, on the line 3—3 in Figure 1, the laminated springs being omitted for the sake of clearness, Figure 4 shows a section on the line 4—4 in Figure 2, and Figure 5 shows a section on the line 5—5 in Figure 1.

With the frame $a$ of the vehicle a steering swivel or axle pin $b$ is connected by means of two transverse springs $c_1$ and $c_2$. These are connected with the frame $a$ by bolts, one of which is shown at $a_1$, the fastening points of the springs to the frame on the one hand and to the axle piece $b$ on the other hand forming the corners of a parallelogram. The axle piece $b$ is carried by the ends of the springs without play, and is thereby guided parallel to itself in the plane of the parallelogram. The ends of these springs are supported upon pivots $d_1$ and $d_2$, in casings which consist of forked joint pieces $e_1$ and $e_2$ and caps $f_1$ and $f_2$ slipped over the latter, and are rotatable about the steering swivel journal $g$, which connects the joint pieces with the steering swivel or axle piece $b$.

The two ends of the pivots $d_1$ and $d_2$ projecting out of the casings are connected with one another by a fishplate $h$. The latter is rotatably supported without clearance upon the lower pivot $d_1$, while the upper eye $i$ of the fishplate embraces the pivot $d_2$ with clearance $k$. In the eye or round the pivot shock-absorbing means, such as india rubber rings or the like, may be provided, which may for example even fill up the entire clearance space, in such a way that the resilience is not impaired. The central cylindrical portion of the fishplate is here enclosed, with the clearance $m_1$, by an india rubber block $m$, which in its turn is supported in an eye $n$ on a guiding link $o$. The clearance $m_1$ is for the purpose of ensuring to the axle piece $b$, and therefore to the vehicle wheel, a certain flexibility in the direction of travel, so far as the laminated springs $c_1$ and $c_2$ permit this. The link $o$ consists of two arms $o_1$ and $o_2$, and is rockably supported on the frame $a$ about a pivot $p$. The arrangement of the guiding link $o$ is here to be such that its connecting points $p$ and $n$ with the frame and the axle swivel respectively on the one hand, together with the connecting points of each of the two laminated springs $c_1$ and $d_2$ with the frame at $a_1$ and with the axle swivel at $d_1$ and $d_2$ respectively on the other hand, form approximately parallelogram-like quadrilaterals, so that the end of the link connected with the axle piece executes a movement substantially equal to that of the ends of the springs. The link swings about an axis which is perpendicular to the plane of the parallelogram of the springs. The link $o$ here serves at the same time as a lever arm for a shock absorber $q$, which may be constructed as a frictional shock absorber, a hydraulic shock absorber, or a shock absorber of any other kind.

The method of operation of this device is as follows:—During normal travelling the vehicle wheel is carried merely by the two transverse springs $c_1$ and $c_2$. The guiding link $o$ then swings with it in a vertical direction, at the same time acting upon the shock absorber $q$, and thereby damping the oscillations of the laminated springs $c_1$ and $c_2$. The angular movements between the link $o$ and the intermediate piece or fishplate $h$ are taken up by the india rubber cushion $m$, which is resilient in all directions, while the clearance $k$ compensates for the inaccuracies between the movement of the link and the movement of the upper laminated spring (as the link forms with each of the laminated springs not an exact parallelogram but only a trapesium) by permitting relative movement between the eye $i$ of the fishplate and a bolt $d_2$. The clearance $m_1$, in the longitudinal direction of the vehicle, is provided for the purpose of not hampering the flexibility of the suspension in this direction, which exists to some extent.

In the event of breakage of a spring, the upper spring for example, the vehicle wheel can only rock outwards by the amount of the clearance $k$, in which case the pivot $d_2$ bears against the eye $i$ of the fishplate. The slight shock which may possibly occur under these circumstances is taken up by an india rubber ring $l$. In the event of breakage of the lower spring, the wheel is held in a corresponding manner by the link $o$.

The link $o$ might of course be resilient itself, and might for example be constructed as a laminated spring. Also instead of one spring $c_1$ or $c_2$, a rigid link might be employed. In this case the auxiliary link $o$ might be arranged directly beside the remaining laminated spring, since it need only maintain a parallelogram guidance of the wheel in conjunction with the rigid link, the connecting points of the auxiliary link with the frame and the axle piece on the one hand and those of the rigid link with the frame and the axle piece on the other hand forming a parallelogram-like quadrilateral.

The invention may also be employed for driving axles, and also for wheels which are suspended in a similar manner by means of two longitudinal springs or the like.

What I claim is:—

1. In an automobile vehicle, an underframe, two laminated springs arranged substantially parallel one above the other and secured to the underframe, an axle piece carrying the vehicle wheel, and connected with the ends of the laminated springs arranged substantially one above the other, an intermediate piece arranged on the axle piece, one end of which is rotatably supported on the axle piece and its other end is supported with clearance on the axle piece, and a guiding link arranged parallel to the laminated springs, one end of the guiding link being pivotally connected with the underframe and its other end with the said intermediate piece.

2. In an automobile vehicle, an underframe, two substantially parallel laminated springs secured to the underframe, the points of attachment being substantially one above the other and the ends of the laminated springs likewise being arranged substantially one above the other, an axle piece carrying the vehicle wheel, a joint piece between the axle piece and the end of the first laminated spring, a further joint piece between the axle piece and the end of the second laminated spring, means for connecting the joint pieces with the axle piece in such a way that the axle piece can rotate about a substantially vertical axis relatively to the joint pieces, and means for connecting the joint pieces with the ends of the laminated springs in such a way that the ends of the laminated springs can swing about substantially horizontal axes relatively to the joint pieces, a connecting piece between the two joint pieces, and a guiding link pivoted at one end to the underframe and at the other end to the connecting piece, the guiding link being arranged substantially parallel to the two laminated springs.

3. The combination claimed in claim 1, the guiding link being arranged substantialy in the plane of the two laminated springs, approximately in the centre between the two laminated springs and parallel to the latter.

4. The combination claimed in claim 2, in conjunction with bolts in the said joint pieces, about which the ends of the laminated springs can swing, caps covering the ends of the spring, and formed with bores by which they are slipped over the bolts, the said connecting piece being formed with bores at its ends by means of which it is secured to the bolts outside the caps, one of the bores surrounding the bolt with clearance.

5. In an automobile vehicle, an underframe, two laminated springs secured to the underframe substantially one above the other, an axle piece carrying the vehicle wheel, means for connecting the ends of the two laminated springs with the axle piece without clearance, the connecting points being arranged substantially one above the other, a rigid supplementary link, a joint by which the link is pivoted to the underframe in such a way that it can swing only about an axis perpendicular to the plane of the oscillation of the laminated springs, the link being arranged substantially parallel to the laminated springs, means for pivotally connecting the link to the axle piece with such clearance therebetween, in the plane of oscillation of the link that the axle piece is freely guided by the laminated springs, and a shock-absorber arranged at the connection between the link and the underframe in such a way that the link acts as a lever arm for actuating the shock-absorber.

6. In an automobile vehicle, an underframe, two laminated springs arranged substantially one above the other and secured to the underframe, an axle piece carrying the vehicle wheel, means for connecting the ends of the two laminated springs with the axle piece without clearance, the connecting points of the laminated springs with the underframe on the one end and with the axle piece on the other hand forming substantially the corners of a quadrilateral, a rigid link arranged substantially parallel to the laminated springs and substantially midway between them, means for pivotally connecting the link with the underframe in such a way that the link, relatively to the underframe, can swing only about an axis perpendicular to the plane of the said quadrilateral, and means for pivotally connecting the link with the axle piece, the pivotal points of the link with the underframe and with the axle piece, in connection with the pivotal points of each of the laminated springs with the underframe and with the axle piece, likewise forming substantially the corners of a quadrilateral, and so much clearance being provided in the pivotal connecting means of the link on the axle piece that the axle piece is freely guided by the laminated springs.

7. The combination claimed in claim 1, further comprising an india rubber cushion interposed between the said axle piece and that end of the said intermediate piece which is supported with clearance on the said axle piece, and an india rubber cushion interposed between the said intermediate piece and that end of the said guiding link which is pivotally connected with the said intermediate piece.

8. The combination claimed in claim 1, further comprising the feature that the connection between the said intermediate piece and that end of the said guiding link which is pivotally connected with the said intermediate piece is formed with clearance in a direction transverse to the said guiding link.

9. In a vehicle, an underframe, an axle-piece carrying the vehicle wheel, two laminated springs arranged substantially one above the other and secured to the underframe, the ends of the springs being pivoted to the axle-piece without clearance in such a way that the axle-piece is guided positively by the two laminated springs alone in the plane of oscillation thereof, and a supplementary link member substantially parallel to the laminated springs, the said link member being so pivoted at one end to the underframe and at the other end to the axle-piece that it can swing only in a plane parallel to the plane of oscillation of the laminated springs, the link member being pivoted with slight clearance in its plane of oscillation in such a way that the clearance permits a free guidance of the axle piece by the laminated springs without guidance by the supplementary link member, and the link member forming, with each of the laminated springs, a jointed quadrilateral, adapted (upon breakage of one of the laminated springs) to guide the axle-piece.

10. In a vehicle, an underframe, an axle-piece carrying the vehicle wheel, two yielding elements arranged substantially one above the other and connecting the underframe with the axle-piece, the said elements alone positively guiding the axle-piece relatively to the underframe, in a vertical plane of oscillation and a supplementary link which is so pivoted at one end to the underframe and at the other end to the axle-piece that it can swing only in a plane parallel to the plane of oscillation of the yielding elements, and which forms with each of these elements a jointed quadrilateral adapted to guide the axle-piece, the link being pivoted with slight clearance in its plane of oscillation in such a way that the clearance permits a free guidance of the axle-piece by the yielding elements without guidance by the supplementary link.

11. In a vehicle, an underframe, an axle-piece carrying the vehicle wheel, two laminated springs arranged substantially one above the other and secured to the underframe, the ends of the springs being pivoted to the axle-piece without clearance in such a way that the axle-piece is guided positively by the two laminated springs in the plane of oscillation thereof, a shock-absorber arranged on the underframe, and a shock-absorber arm adapted to swing about an axis on the underframe perpendicular to the plane of oscillation of the laminated springs, the free end of the shock-absorber arm being pivoted to the axle-piece, the ends of the shock-absorber arm being so arranged as to form, with the free end of each laminated spring and with the spring fastening of the same laminated spring to the underframe, in the case of each spring separately, a jointed quadrilateral, adapted (upon breakage of one of the laminated springs) to guide the axle-piece.

12. In a vehicle, an underframe, an axle-piece carrying the vehicle wheel, two yielding elements arranged substantially one above the other and connecting the underframe with the axle-piece, the said elements positively guiding the axle-piece relatively to the underframe in a vertical plane of oscillation, a shock-absorber arranged on the underframe, and a shock-absorber arm adapted to swing in a plane parallel to the plane of oscillation of the yielding elements about an axis on the underframe perpendicular thereto, the free end of the shock-absorber arm being pivoted to the axle-piece, and the shock-absorber arm forming with each of the yielding elements a jointed quadrilateral adapted to guide the axle-piece.

13. In a vehicle, an underframe, an axle-piece carrying the vehicle wheel, two laminated springs arranged substantially one above the other and secured to the underframe, the ends of the springs being pivoted to the axle-piece in such a way that the axle-piece is guided positively by the two laminated springs alone in the plane of oscillation thereof, a supplementary rigid link which is so pivoted at one end to the underframe that it can swing only in a plane parallel to the plane of oscillation of the laminated springs, and which is pivoted at the other end to the axle-piece, the link forming with each of the two laminated springs a jointed quadrilateral adapted to guide the axle-piece.

14. In a vehicle, an underframe, an axle-piece carrying the vehicle wheel, two swinging elements arranged substantially one above the other and secured to the underframe, the ends of the swinging elements being pivoted to the axle-piece in such a way that the axle-piece is guided positively by the two swinging elements alone in the plane of oscillation thereof, a supplementary rigid link, a pivot transverse to the plane of oscillation of the swinging elements by which the supplementary rigid link is so pivoted at one end to the underframe that it can swing only in a plane parallel to the plane of oscillation of the swinging elements about the axis of the pivot, and pivoting means by which the supplementary rigid link is pivoted at the other end to the axle-piece, the link forming with each of the two swinging elements a jointed quadrilateral adapted to guide the axle-piece

MAX WAGNER.